US008831752B2

(12) United States Patent
Huang et al.

(10) Patent No.: US 8,831,752 B2
(45) Date of Patent: Sep. 9, 2014

(54) CONTROL SYSTEM AND CONTROL METHOD FOR IDENTIFYING CORRESPONDING POSITION

(75) Inventors: Yung-Ching Huang, Hsinchu (TW); Yu-Wei Hung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 468 days.

(21) Appl. No.: 13/307,259

(22) Filed: Nov. 30, 2011

(65) Prior Publication Data
US 2012/0330441 A1 Dec. 27, 2012

(30) Foreign Application Priority Data

Jun. 24, 2011 (TW) ............................. 100122331 A

(51) Int. Cl.
G06F 19/00 (2011.01)
G06F 1/16 (2006.01)
G06F 3/03 (2006.01)

(52) U.S. Cl.
CPC ............... *G06F 1/1632* (2013.01); *G06F 3/03* (2013.01)
USPC ................................. 700/9; 323/237; 327/63

(58) Field of Classification Search
USPC .................................. 700/9; 327/63; 323/237
See application file for complete search history.

(56) References Cited

U.S. PATENT DOCUMENTS

| 5,355,743 | A | * | 10/1994 | Tesar | ......................... | 74/490.03 |
| 5,686,887 | A | | 11/1997 | Chen et al. | | |
| 7,558,622 | B2 | * | 7/2009 | Tran | ............................. | 600/509 |
| 7,746,023 | B2 | | 6/2010 | Ajima et al. | | |
| 7,769,510 | B2 | | 8/2010 | Denholm et al. | | |
| 2005/0267664 | A1 | * | 12/2005 | Ouyang | .......................... | 701/70 |
| 2010/0191383 | A1 | | 7/2010 | Gaul | | |

FOREIGN PATENT DOCUMENTS

| TW | 200921627 A | 5/2000 |
| TW | 401688 | 8/2000 |
| TW | I233008 | 5/2005 |
| TW | 200923775 | 6/2009 |
| TW | 201011867 | 3/2010 |
| TW | 201038083 A1 | 10/2010 |

OTHER PUBLICATIONS

Office Action issued on Jan. 14, 2014 by Taiwan Patent Office for the corresponding Taiwan Patent Application No. 100122331.
James A. Bednar et al., Self-organization of spatiotemporal receptive fields and laterally connected direction and orientation maps, Neuerocomputing, 2003, pp. 473-480.
George V. Paul et al., A Quasi-Linear Method for Computing and Projecting onto C-Surfaces: General Case, Proceedings of the 1997 IEEE/RSJ Internaitonal Conference on Intelligent Robots and Systems, 1997, p. 1183-1188.
Y. Papegay et al., A Lazy Algorithm for Planning Motions in Contact, Proceedings of the IEEE/RSJ/GI International Conference on Intelligent Robots and Systems, 1994, pp. 2152-2159.

* cited by examiner

*Primary Examiner* — Michael D Masinick
(74) *Attorney, Agent, or Firm* — WPAT, P.C.; Anthony King; Kay Yang

(57) ABSTRACT

The disclosed exemplary embodiments relates to a control system and a control method for identifying corresponding position. The control system includes a plurality of electronic control modules, each electronic control module having a microcontroller electrically coupled to at least one joint, and the joint is configured for connecting to a joint of neighboring electronic control module. The electronic control modules include a main-control-terminal electronic control module, an assembling electronic control module and at least one detecting electronic control module. The main-control-terminal electronic control module is configured for assigning one of the electronic control modules to be the assembling electronic control module, and assigning the rest of the electronic control modules to be the detecting electronic control module. The assembling electronic control module is configured for obtaining an identifying signal of the neighboring electronic control module so as to recognize the corresponding position of the electronic control modules.

20 Claims, 13 Drawing Sheets

| A | B | C | D | E | D | C | B |
| B | C | D | E | F | E | D | C |
| C | D | E | F | G | F | E | D |
| D | E | F | G | H | G | F | E |
| C | D | E | F | G | F | E | D |
| B | C | D | E | F | E | D | C |

(H = main-control-terminal electronic control module)

68

| Orientation of the electronic control module | | | | |
|---|---|---|---|---|
| the pin number in each direction | | 0° | 90° | 180° | 270° |
| | Upper | 1 | 2 | 3 | 4 |
| | Right | 2 | 3 | 4 | 1 |
| | Lower | 3 | 4 | 1 | 2 |
| | Left | 4 | 1 | 2 | 3 |

CONTROL SYSTEM AND CONTROL METHOD FOR IDENTIFYING CORRESPONDING POSITION

BACKGROUND

1. Technical Field

The present disclosure relates to a control system and a control method for identifying corresponding position.

2. Description of the Related Art

A sensing system in general has a plurality of sensing and control elements, and each sensing and control element has a plurality of joints and a plurality of detection pin levels. Each joint is electrically connected to each detection pin level, and the joint of each sensing and control element is connected to each other, the sensing and control elements may be assembled to perform a pressure or position sensing operation. For example, a pressure or contact sensor placed in an environment can implement low-intrusion activity behavior identification, in cooperation with appropriate arrangement and appropriate identification algorithm, for the application of providing care or security monitoring; or a pressure (or contact) sensing mattress or mat in an array multi-point design can detect the near-bed activity behaviors such as lying posture, getting up, and leaving the bed, for the application of near-bed care.

However, the sensing and control elements do not have a direction identifying function, so the sensing and control elements cannot obtain the corresponding position of each other. Therefore, in assembly, the sensing and control elements must be assembled in a specific order or in an order manually set in advance, which is inconvenient for the assembler or the user. Moreover, mis-operations of the system could be caused due to errors in assembly.

Such that there is an issue of how to provide a control system for identifying corresponding position to solve the above problem.

SUMMARY

An exemplary embodiment discloses a control system for identifying corresponding position, which at least includes a plurality of electronic control modules, in which each electronic control module includes a microcontroller electrically coupled to at least one joint, and the joint is configured for connecting to a joint of neighboring electronic control module. The electronic control modules include a main-control-terminal electronic control module, an assembling electronic control module and at least one detecting electronic control module. The main-control-terminal electronic control module is configured for assigning one of the electronic control modules to be the assembling electronic control module, and assigning the rest of the electronic control modules to be the detecting electronic control module. The assembling electronic control module is configured for obtaining an identifying signal of a neighboring detecting electronic control module to recognize corresponding position of the electronic control modules.

Another exemplary embodiment discloses a control method for identifying corresponding position, which at least includes: providing a plurality of electronic control modules, in which each electronic control module has a microcontroller and at least one joint, the microcontroller is electrically coupled to the joint, and the joint is used for connecting to a joint of a neighboring electronic control module; assigning one of the electronic control modules to be an assembling electronic control module and assigning the rest of the electronic control modules to be a detecting electronic control module by a main-control-terminal electronic control module; and obtaining an identifying signal of a neighboring detecting electronic control module by the assembling electronic control module to recognize corresponding position of the electronic control modules.

DETAILED DESCRIPTION OF DISCLOSED EMBODIMENTS

Figure 1:
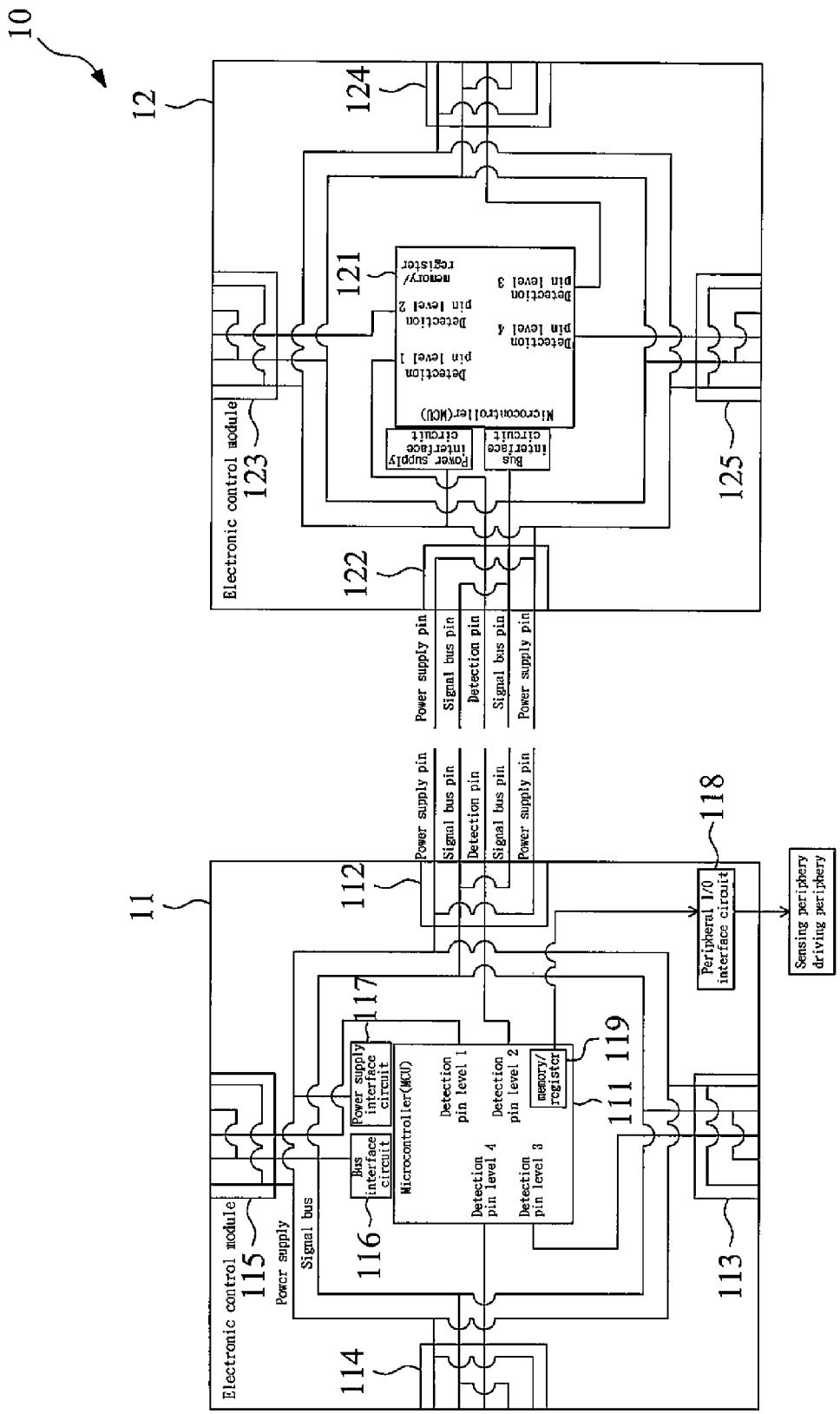
FIG. 1 is a schematic view of a control system for identifying corresponding position according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of a control system for identifying corresponding position according to an exemplary embodiment. Referring to FIG. 1, the control system 10 for identifying corresponding position includes a plurality of electronic control modules. In this embodiment, two electronic control modules 11 and 12 are taken as an example for illustration.

Each electronic control module has a microcontroller and at least one joint, in which the microcontroller is electrically coupled to the joint, and the joint is used for connecting to a joint of a neighboring electronic control module. In this embodiment, the electronic control module 11 has a microcontroller 111 and three joints 112, 113 and 114, and the microcontroller 111 is electrically coupled to the joints 112, 113 and 114. The electronic control module 12 has a microcontroller 121 and four joints 122, 123, 124 and 125, and the microcontroller 121 is electrically coupled to the joints 122, 123, 124 and 125. The joint 112 of the electronic control module 11 is connected to the joint 122 of the neighboring electronic control module 12.

Figure 2:
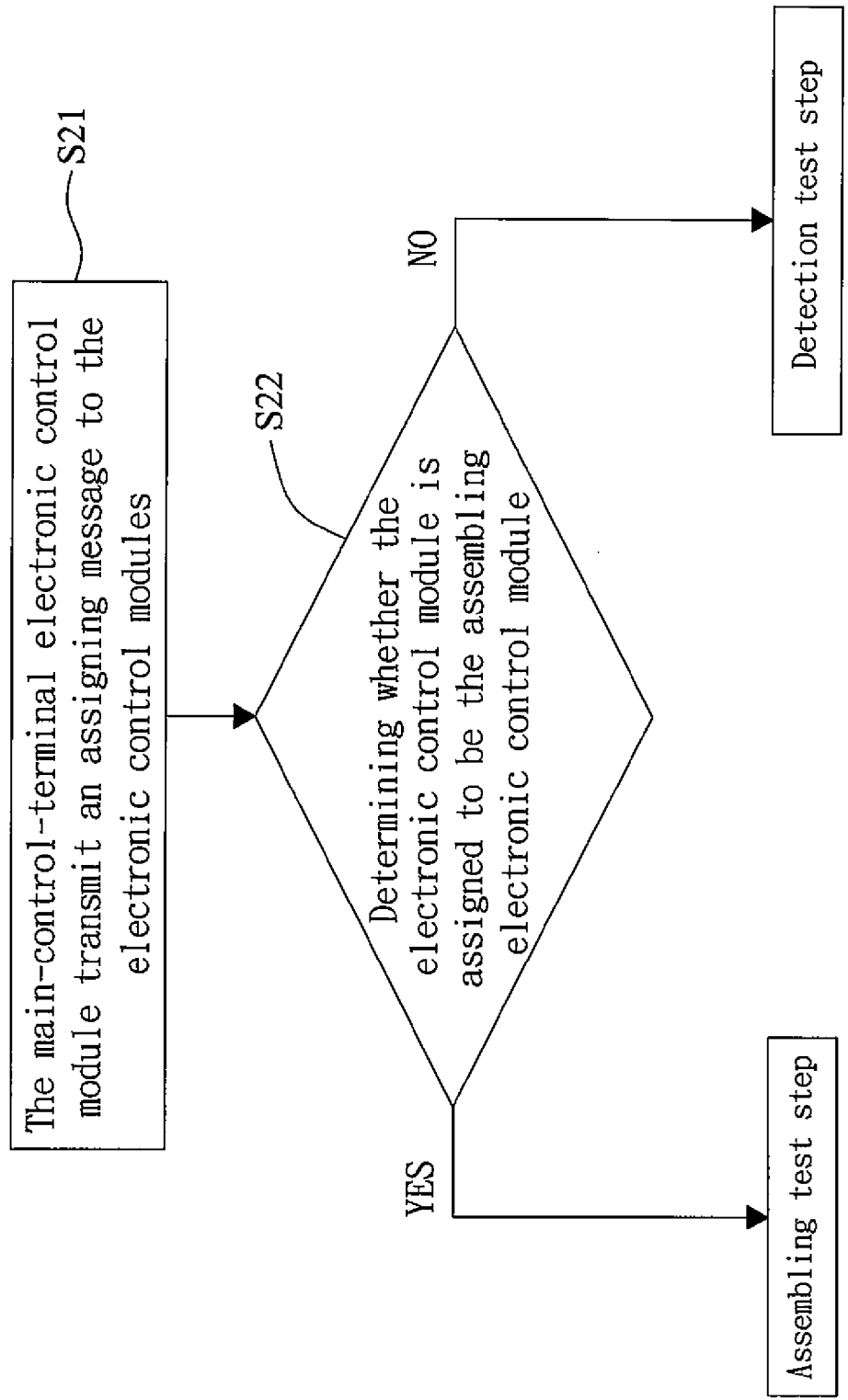
FIG. 2 is a schematic view of the disclosed control system assigning electronic control modules according to an exemplary process embodiment.

FIG. 2 is a schematic view of the disclosed control system assigning electronic control modules according to an exemplary process embodiment. Referring to FIG. 1 and FIG. 2, the electronic control modules include a main-control-terminal electronic control module, an assembling electronic control module and at least one detecting electronic control module. The main-control-terminal electronic control module is used for assigning one of the electronic control modules to be the assembling electronic control module and assigning the rest of the electronic control modules to be the detecting electronic control module. In this embodiment, the main-control-terminal electronic control module is the electronic control module 11, assigns itself to be the assembling electronic control module, and assigns the electronic control module 12 to be the detecting electronic control module. As the main-control-terminal electronic control module 11 is electrically connected to all the electronic control modules through the joints, the main-control-terminal electronic control module 11 can transmit an assigning message to the electronic control modules, as shown in Step S21. The main-control-terminal electronic control module 11 further includes a connection port 115, for connecting to an external circuit (not shown). In this embodiment, the main-control-terminal electronic control module 11 further includes a peripheral I/O interface circuit 118, for connecting to an external sensing periphery/driving periphery.

Figure 3:
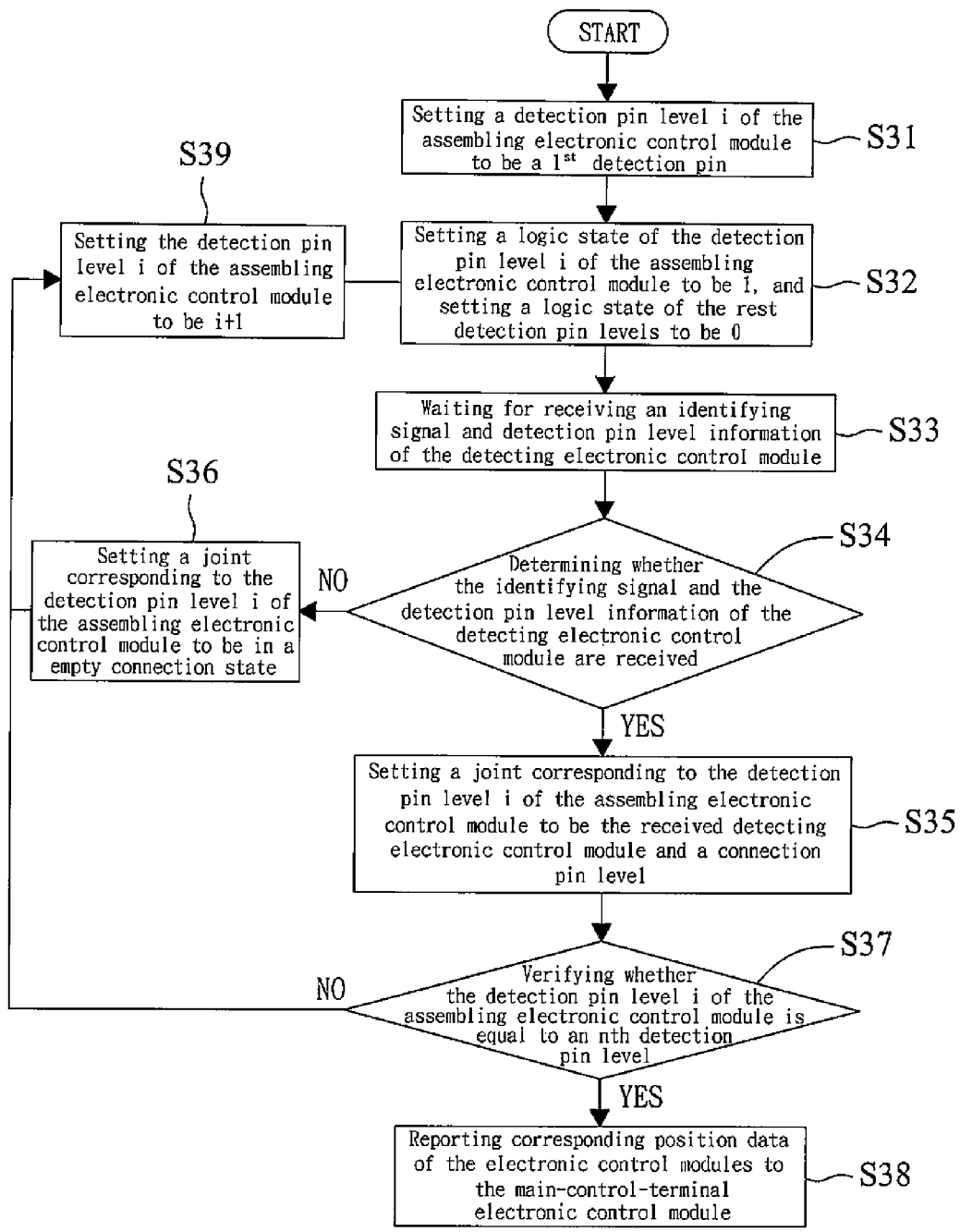
FIG. 3 is a schematic view of assembling test steps of a disclosed control method according to an exemplary process embodiment.
Figure 4:
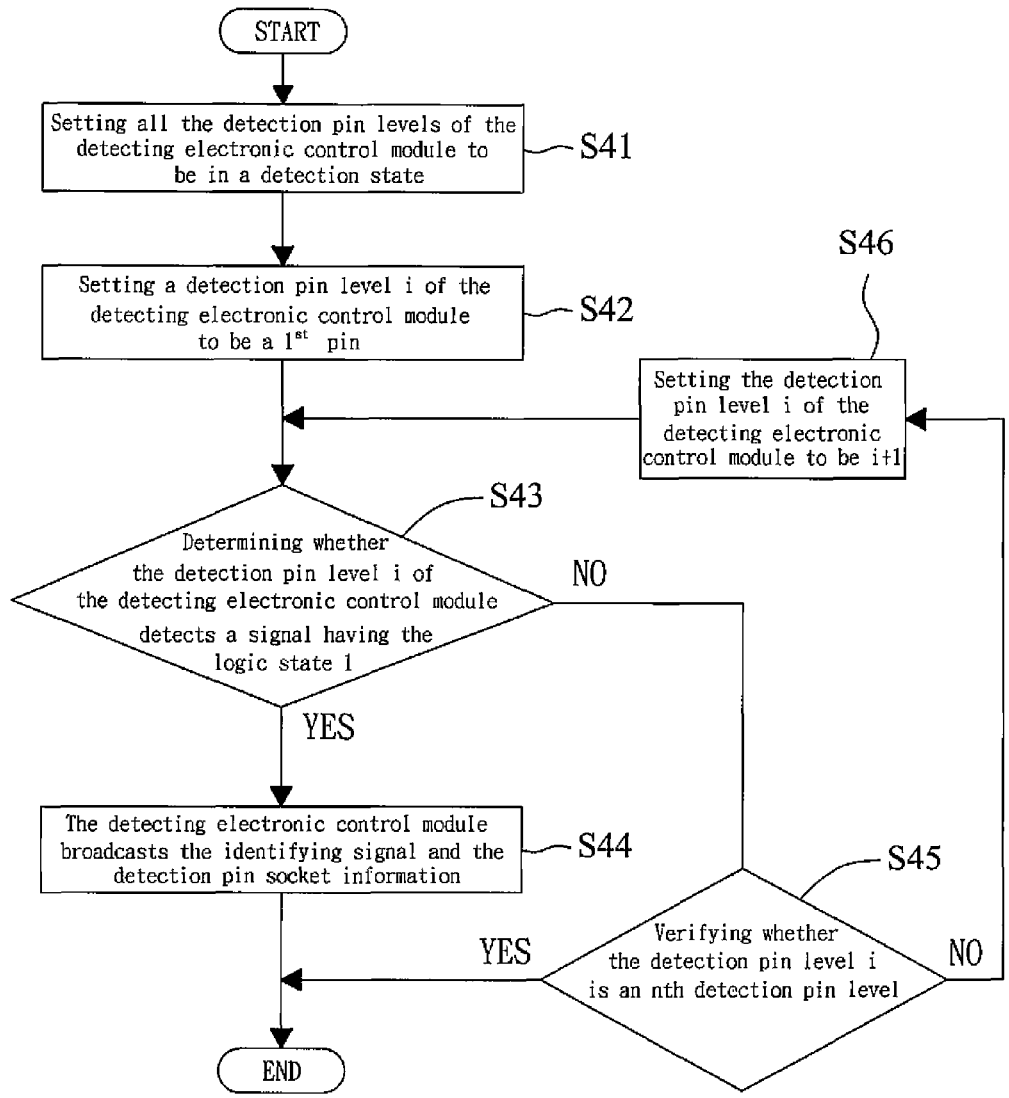
FIG. 4 is a schematic view of detection test steps of the disclosed control method according to an exemplary process embodiment.

Referring to Step S22, it is determined whether the electronic control module is assigned to be the assembling electronic control module. In this embodiment, the electronic control module 11 is the assembling electronic control module, and executes assembling test steps, as shown in FIG. 3. If it is determined that the electronic control module is not the assembling electronic control module, the electronic control module 12 is the detecting electronic control module, and executes detection test steps, as shown in FIG. 4.

FIG. 3 is a schematic view of assembling test steps of a disclosed control method according to an exemplary process embodiment. Referring to FIG. 1 and FIG. 3, in this embodiment, the joint includes a detection pin and at least one signal bus pin. The microcontroller has a signal bus and at least one detection pin level. The signal bus is electrically connected to the signal bus pin, and the detection pin level is electrically connected to the detection pin.

Referring to Step S31, a detection pin level i of the assembling electronic control module 11 is set to be a 1st detection pin, in which i=1, that is, a detection pin level 1 of the assembling electronic control module 11 is set to be the 1st detection pin. Referring to Step S32, a logic state of the detection pin level i of the assembling electronic control module 11 is set to be 1 (a second logic state), and a logic state of the rest detection pin levels is set to be 0 (a first logic state). Referring to Step S33, the assembling electronic control module 11 waits for receiving an identifying signal and detection pin level information of the detecting electronic control module 12 connected to the detection pin level i. Referring to Step S34, in a waiting period, it is determined whether the identifying signal and the detection pin level information of the detecting electronic control module 12 are received.

Referring to Step S35, if the identifying signal and the detection pin level information of the detecting electronic control module are received, a joint corresponding to the detection pin level i of the assembling electronic control module 11 is set to be the received detecting electronic control module and a connection pin level. Referring to Step S36, if the identifying signal and the detection pin level information of the detecting electronic control module are not received, a joint corresponding to the detection pin level i of the assembling electronic control module 11 is set to be in a empty connection state, that is, the joint is not connected to any detecting electronic control module.

Referring to Step S37, it is verified whether the detection pin level i of the assembling electronic control module 11 is equal to an predefined $n^{th}$ detection pin level. In this embodiment, the assembling electronic control module 11 has three joints and three detection pin levels, so n=3. Referring to Step S38, if the detection pin level i of the assembling electronic control module 11 is not equal to the $n^{th}$ detection pin level, the detection pin level i of the assembling electronic control module 11 is set to be i+1, and the steps after setting the logic state of the detection pin level i of the assembling electronic control module 11 to be 1 are repeated, till all the three detection pin levels are set. Referring to Step S39, if the detection pin level i of the assembling electronic control module 11 is equal to the $n^{th}$ detection pin level, corresponding position data of the electronic control modules is reported to the main-control-terminal electronic control module, that is, the corresponding position data of all the detecting electronic control modules connected to the assembling electronic control module 11 is reported to the main-control-terminal electronic control module. In other embodiments, the corresponding position data of the detecting electronic control module connected to the assembling electronic control module 11 and recognized by the assembling electronic control module 11 each time is reported to the main-control-terminal electronic control module.

FIG. 4 is a schematic view of detection test steps of the disclosed control method according to an exemplary process embodiment. Referring to FIG. 1 and FIG. 4, the detecting electronic control module 12 executes a detection mode test step. Referring to Step S41, all the detection pin levels of the detecting electronic control module 12 are set to be in a detection state. Referring to Step S42, a detection pin level i of the detecting electronic control module 12 is set to be a $1^{st}$ pin, in which i=1, that is, a detection pin level 1 of the detecting electronic control module 12 is set to be the $1^{st}$ pin.

Referring to Step S43, it is determined whether the detection pin level i of the detecting electronic control module 12 detects a signal having the logic state 1, the signal having the logic state 1 is from the assembling electronic control module 11. Referring to Step S44, if the detection pin level i of the detecting electronic control module 12 detects the signal having the logic state 1, the detection pin level i sets detection pin level information, and then the detecting electronic control module 12 broadcasts the identifying signal and the detection pin socket information, as shown in Step S44.

Referring to Step S45, if the detection pin level i of the detecting electronic control module 12 does not detect the signal having the logic state 1, it is verified whether the detection pin level i is an $n^{th}$ detection pin level, if the detection pin level i is equal to the $n^{th}$ detection pin level, the detecting electronic control module 12 ends the detection test process.

Referring to Step S46, if the detection pin level i is not equal to the $n^{th}$ detection pin level, the detection pin level i of the detecting electronic control module is set to be i+1, and the steps after determining whether the detection pin level i of the detecting electronic control module detects the signal having the logic state 1 are repeated.

In this embodiment, the main-control-terminal electronic control module assigns one of the electronic control modules to be an assembling electronic control module and assigns the rest of the electronic control modules to be the detecting electronic control module in turn. That is to say, as described above, the main-control-terminal electronic control module is the electronic control module 11, and the main-control-terminal electronic control module assigns itself to be the assembling electronic control module, and assigns the electronic control module 12 to be the detecting electronic control module. After the assembling electronic control module 11 reports the corresponding position data of all the detecting electronic control modules connected thereto to the main-control-terminal electronic control module, the main-control-terminal electronic control module assigns the electronic control module 12 to be the assembling electronic control module to execute the assembling test steps in FIG. 3, and assigns the electronic control module 11 to be the detecting electronic control module to execute the detection test steps in FIG. 4. At this time, the assembling electronic control module is the electronic control module 12, and reports the corresponding position data of all the detecting electronic control modules connected thereto to the main-control-terminal electronic control module. Therefore, the main-control-terminal electronic control module can recognize the corresponding positions of the electronic control modules.

Through the disclosed control system and control method, a user can flexibly perform the assembly operation without special joints corresponding to the electronic control modules. Moreover, as the electronic control modules can effectively recognize the physical direction and position relation therebetween, the disclosed control system and control method can automatically recognize the corresponding position through merely completing the assembly, thereby achieving flexible assembly, and effectively assembling the sensing elements into various sizes for application in various environments and spaces with different sizes.

Referring to the exemplary embodiment in FIG. 1 again, each electronic control module further includes a bus interface circuit, in which the signal bus of the microcontroller is electrically connected to the signal bus pin through the bus interface circuit. For example, the electronic control module 11 further includes a bus interface circuit 116, and the signal bus of the microcontroller 111 is electrically connected to the signal bus pin of each joint through the bus interface circuit 116.

Furthermore, each electronic control module further includes a power supply interface circuit. The microcontroller has a power supply pin level, the joint has a power supply pin, and the power supply pin level of the microcontroller is electrically connected to the power supply pin through the power supply interface circuit. For example, the electronic control module 11 further includes a power supply interface circuit 117. The microcontroller 111 has a power supply pin level, each joint has a power supply pin, and the power supply pin level of the microcontroller 111 is electrically connected to the power supply pin through the power supply interface circuit 117. The microcontroller 111 may further include a storage unit 119 e.g., memory or register etc., but not limited.

Additionally, if the disclosed control system 10 is applied in a sensing system, each electronic control module may further include a plurality of sensors. The sensors in the electronic control module do not need to be set manually, but can automatically identify the corresponding position after assembly.

Figure 5:
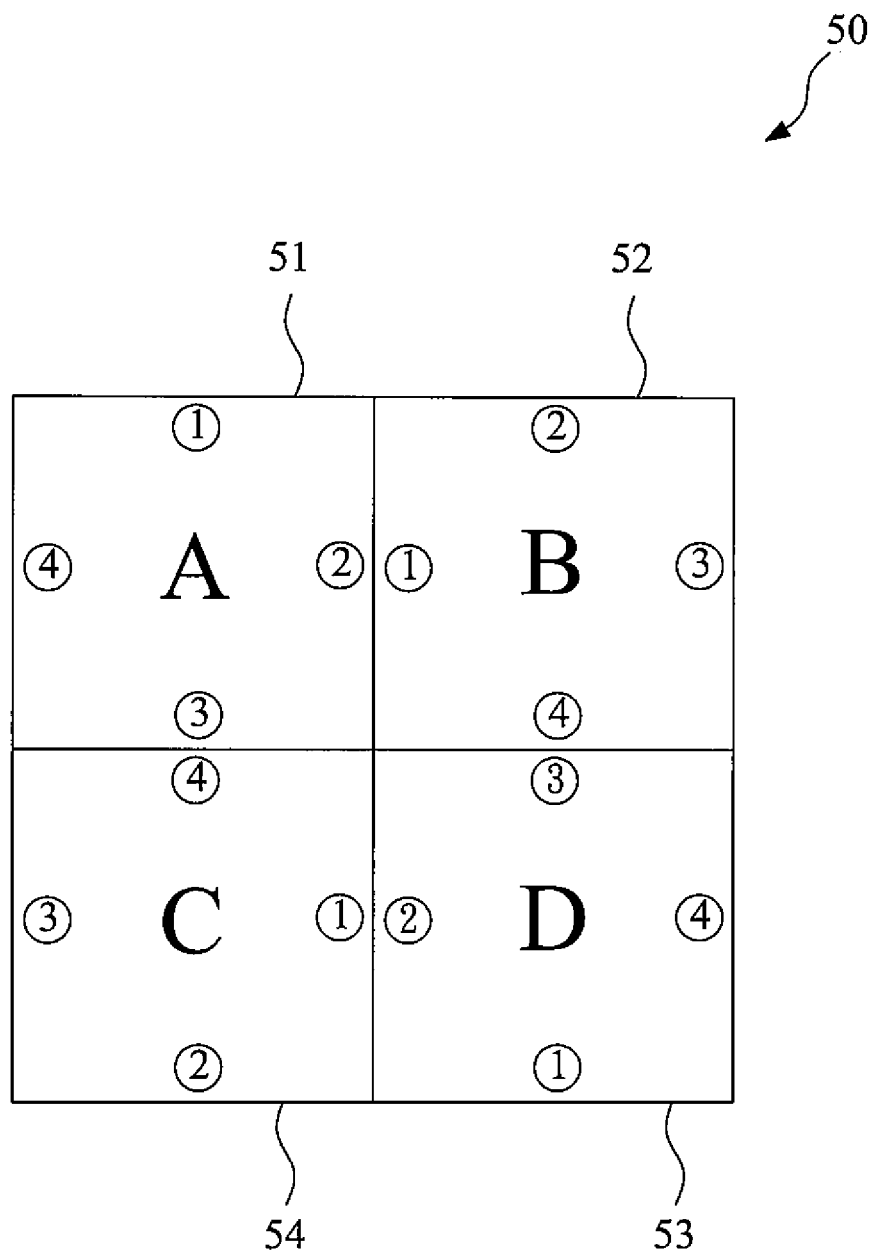
FIG. 5 is a schematic view of a control system for identifying corresponding position according to another exemplary embodiment.

FIG. 5 is a schematic view of a control system for identifying corresponding position according to another exemplary embodiment. The control system 50 for identifying the corresponding position includes four electronic control modules 51, 52, 53 and 54. In this embodiment, the circuit structure of the four electronic control modules 51, 52, 53 and 54 is the same as that of the electronic control modules 11 and 12 in the first embodiment, which will not be repeated herein.

Figure 6:
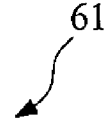
FIG. 6 is a schematic view of a relative rotation angle corresponding table of an assembling module and a detecting module according to an exemplary embodiment.

FIG. 6 is a schematic view of a relative rotation angle corresponding table of an assembling module and a detecting module according to an exemplary embodiment. Referring to FIG. 5 and FIG. 6, the horizontal ordinates represent the assembling electronic control module, and the longitudinal coordinates represent the detecting electronic control module. The joint 2 of the electronic control module 51 is connected to the electronic control module 52, and the configuration of the electronic control module 52 is left rotation for 90 degrees with respect to the electronic control module 51; and the joint 3 of the electronic control module 51 is connected to the electronic control module 53, and the configuration of the electronic control module 53 is left rotation for 270 degrees with respect to the electronic control module 51. The joint 1 of the electronic control module 52 is connected to the electronic control module 51, and the configuration of the electronic control module 51 is left rotation for 270 degrees with respect to the electronic control module 52; and the joint 4 of the electronic control module 52 is connected to the electronic control module 54, and the configuration of the electronic control module 54 is left rotation for 90 degrees with respect to the electronic control module 52. The joint 1 of the electronic control module 53 is connected to the electronic control module 54, and the configuration of the electronic control module 54 is left rotation for 270 degrees with respect to the electronic control module 53; and the joint 4 of the electronic control module 53 is connected to the electronic control module 51, and the configuration of the electronic control module 51 is left rotation for 90 degrees with respect to the electronic control module 53. The joint 2 of the electronic control module 54 is connected to the electronic control module 53, and the configuration of the electronic control module 53 is left rotation for 90 degrees with respect to the electronic control module 54; and the joint 3 of the electronic control module 54 is connected to the electronic control module 52, and the configuration of the electronic control module 52 is left rotation for 270 degrees with respect to the electronic control module 54.

Additionally, with respect to the configuration of the electronic control module 51, the configuration of the electronic control module 52 is left rotation for 90 degrees; and the configuration of the electronic control module 53 is left rotation for 270 degrees; and the configuration of the electronic control module 54 is left rotation for 180 degrees. The main-control-terminal electronic control module can recognize the corresponding positions of the electronic control modules.

Referring to FIG. 1, FIG. 6, FIG. 7 and FIG. 8, in an embodiment, the main-control-terminal electronic control module 11 may apply an array corresponding table, a main-control-terminal orientation corresponding table 62, an electronic control module orientation corresponding table 63 and a relative rotation angle corresponding table 61 of the assembling electronic control module and the detecting electronic control module. The array corresponding table is used for storing an identifier (ID) and orientation of an electronic control module array arrangement, and is filled according to an assembly detection result in an initialization process. When the system operates, sensing data is parsed or control is performed according to the corresponding table.

Figure 7:
FIG. 7 is a schematic view of a disclosed main-control-terminal orientation corresponding table according to an exemplary embodiment.

The main-control-terminal orientation corresponding table 62 is used for defining a main-control-terminal orientation according to a non-empty connection pin level of the main-control-terminal electronic control module 11, and is recorded in the main-control-terminal electronic control module 11 or recorded in a storage device in the system in advance. Referring to FIG. 5, if the electronic control module 51 is the main-control-terminal electronic control module, the joint 2 is connected to the electronic control module 52, and the joint 3 is connected to the electronic control module 54. Therefore, the non-empty connection pin levels of the main-control-terminal electronic control module are the joints 2 and 3, and the orientation is 0 degree, as shown in FIG. 7.

Figures 8, 9:
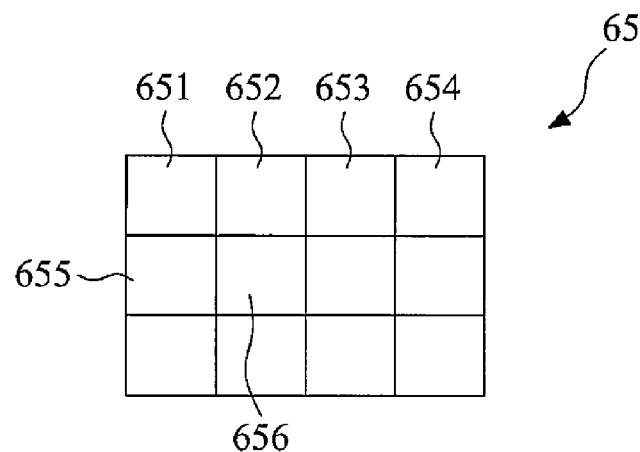
FIG. 8 is a schematic view of a disclosed electronic control module orientation corresponding table according to an exemplary embodiment.
FIG. 9 is a schematic view of a disclosed electronic control module array according to a first exemplary embodiment.

Referring to FIG. 8, the electronic control module orientation corresponding table 63 is used for getting the pin levels in the corresponding direction by the electronic control module according to the orientation, and is recorded in the main-control-terminal electronic control module 11 or recorded in a storage device in the system in advance. Referring to FIG. 6, the relative rotation angle corresponding table 61 of the assembling module and the detecting module is used for defining the electronic control module orientation according to the detection pin level relation by two neighboring electronic control modules, and is recorded in the main-control-terminal electronic control module 11 or recorded in a storage device in the system in advance. FIG. 9 is a schematic view of a disclosed electronic control module array according to a first exemplary embodiment. In the electronic control module array 65 of this exemplary embodiment, the electronic control module array 65 includes a main-control-terminal electronic control module 651 and a plurality of electronic control modules 652, 653, 654, 655 and 656. The main-control-terminal electronic control module 651 is located at a position of a first row and a first column in the electronic control module array 65, that is, a position at the upper left corner. Referring to FIG. 7 and FIG. 5, if the pin levels 2 and 3 of the main-control-terminal electronic control module 651 are non-empty connection pin levels, the orientation of the main-control-terminal electronic control module is 0 degree.

Figure 10A:
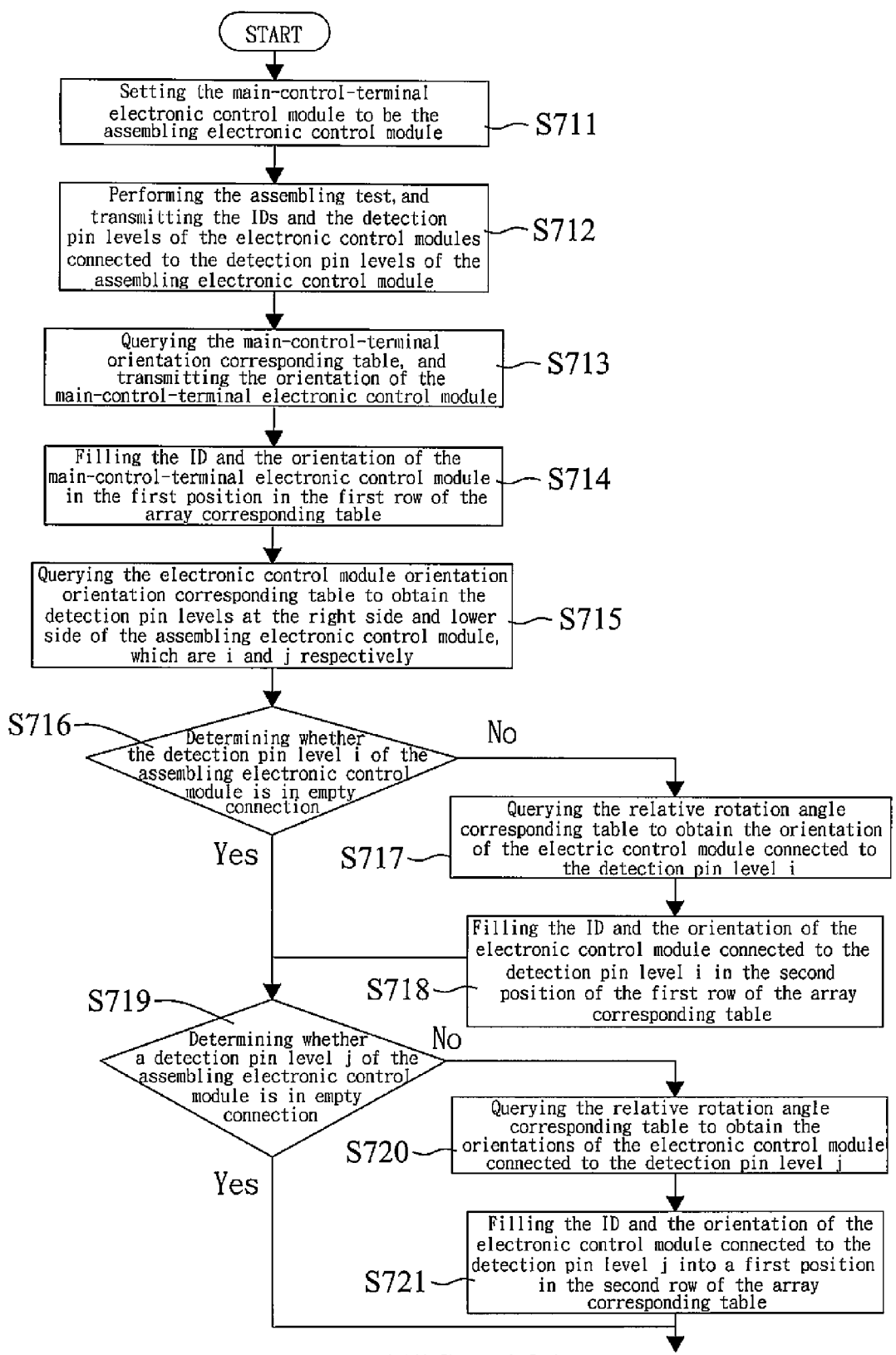
FIG. 10A and FIG. 10B are schematic views of an exemplary embodiment of a decision process of the disclosed electronic control module array according to the first exemplary embodiment.
Figure 10B:
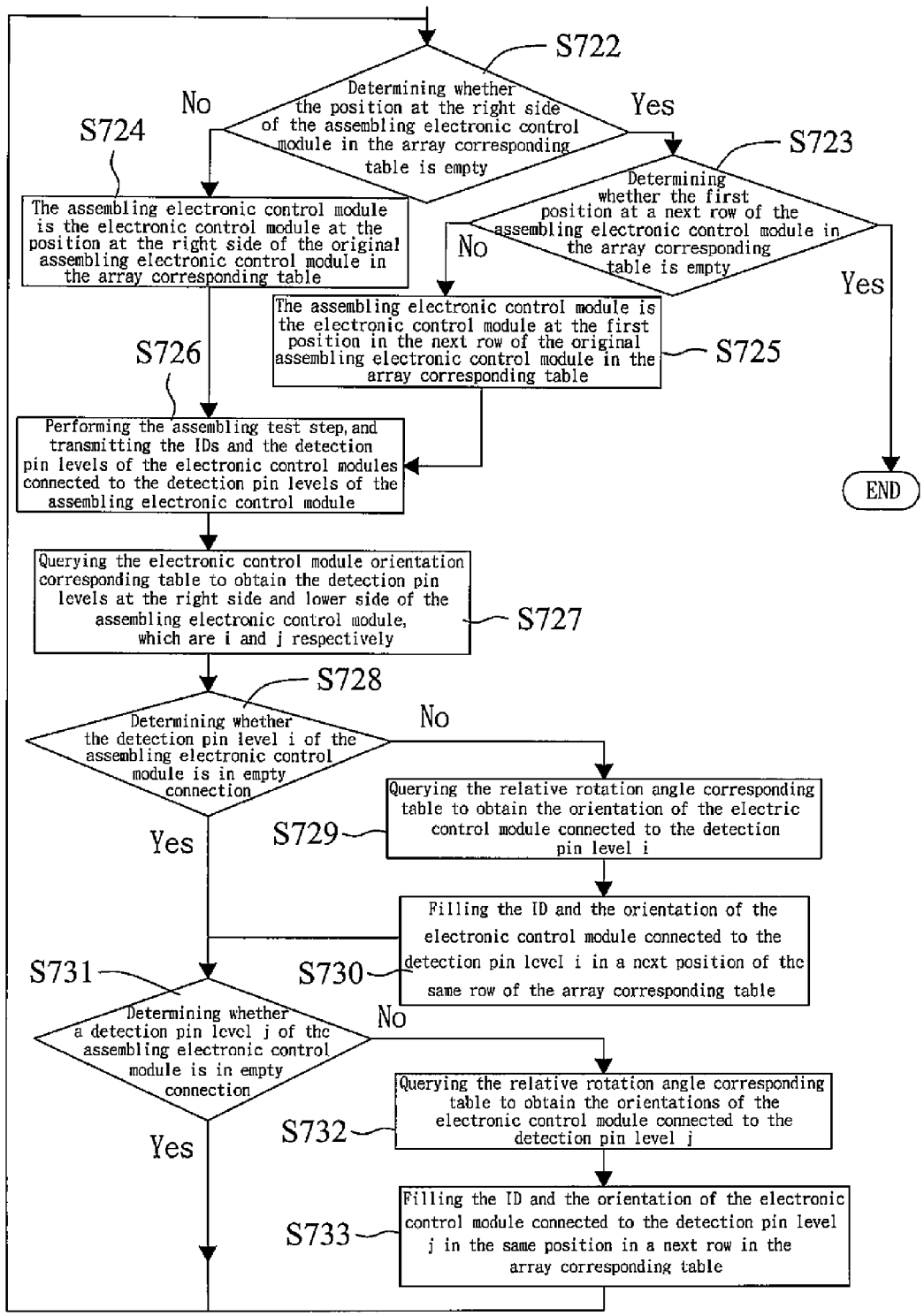

FIG. 10A and FIG. 10B are schematic views of an exemplary embodiment of a decision process of the disclosed electronic control module array according to the first exemplary embodiment. Referring to FIG. 9, FIG. 10A and FIG. 10B, first, referring to Step S711, the main-control-terminal electronic control module 651 is set to be the assembling electronic control module, and the assembling test steps described above is performed, and the IDs and the detection pin levels of the electronic control modules connected to the detection pin levels of the assembling electronic control module are transmitted, as shown in Step S712.

Referring to Step S713, the main-control-terminal orientation corresponding table is queried, and the orientation of the main-control-terminal electronic control module 651 is transmitted. In this embodiment, the orientation of the main-control-terminal electronic control module 651 is 0 degree. Referring to Step S714, the ID and the orientation of the main-control-terminal electronic control module 651 are filled in the first position in the first row of the array corresponding table. Referring to Step S715, the electronic control module orientation corresponding table is queried to obtain the detection pin levels at the right side and lower side of the assembling electronic control module, which are i and j respectively. As the orientation of the main-control-terminal electronic control module is 0 degree, other electronic control modules are merely connected to the right side and the lower side. Therefore, the obtaining of detection pin level values at the right side and the lower side of the assembling electronic control module is sufficient.

Referring to Step S716, it is determined whether the detection pin level i of the assembling electronic control module is in empty connection. If the detection pin level i is not in empty connection, referring to Step S717, the relative rotation angle corresponding table is queried to obtain the orientation of the electric control module connected to the detection pin level i. Referring to Step S718, the ID and the orientation of the electronic control module 652 connected to the detection pin level i are filled in the second position of the first row of the array corresponding table.

If the detection pin level i is in empty connection, referring to Step S719, it is determined whether a detection pin level j of the assembling electronic control module is in empty connection. If the detection pin level j is not in empty connection, referring to Step S720, the relative rotation angle corresponding table is queried to obtain the orientations of the electronic control module connected to the detection pin level j. Referring to Step S721, the ID and the orientation of the electronic control module 655 connected to the detection pin level j are filled into a first position in the second row of the array corresponding table.

Referring to Step S722, it is determined whether the position at the right side of the assembling electronic control module in the array corresponding table is empty. If the position is not empty, referring to Step S724, the assembling electronic control module is the electronic control module 652 at the position at the right side of the original assembling electronic control module in the array corresponding table, the assembling test steps described above is performed, and the IDs and the detection pin levels of the electronic control modules connected to the detection pin levels of the assembling electronic control module are transmitted, as shown in Step S726.

Referring to Step S727, the electronic control module orientation corresponding table is queried to obtain the detection pin levels at the right side and the lower side of the assembling electronic control module, which are i and j respectively. Referring to Step S728, it is determined whether the detection pin level i of the assembling electronic control module is in empty connection. If the detection pin level i is not in empty connection, referring to Step S729, the relative rotation angle corresponding table is queried to obtain the orientation of the electronic control module connected to the detection pin level i. Referring to Step S730, the ID and the orientation of the electronic control module 653 connected to the detection pin level i are filled in a next position of the same row of the array corresponding table.

If the detection pin level i is in empty connection, referring to Step S731, it is determined whether the detection pin level j of the assembling electronic control module is in empty connection. If the detection pin level j is not in empty connection, referring to Step S732, the relative rotation angle corresponding table is queried to obtain the orientation of the electronic control module connected to the detection pin level j. Referring to Step S733, the ID and the orientation of the electronic control module 656 connected to the detection pin level j are filled in the same position in a next row in the array corresponding table.

Then, referring to Step S722 again, it is determined whether the position at the right side of the assembling electronic control module in the array corresponding table is empty, and the above steps are repeated, till the position at the right side of the last electronic control module 654 in the first row of the electronic control module array 65 is empty. Referring to Step S723, it is determined whether the first position at a next row of the assembling electronic control module in the array corresponding table is empty. If the first position is not empty, referring to Step S725, the assembling electronic control module is the electronic control module 655 at the first position in the next row of the original assembling electronic control module in the array corresponding table, and Step S726 and steps after Step S726 are performed. The above steps are repeated, till it is determined that the first position in the next row of the assembling electronic control module in the array corresponding table is empty in Step S723, the process is ended.

Figure 11:
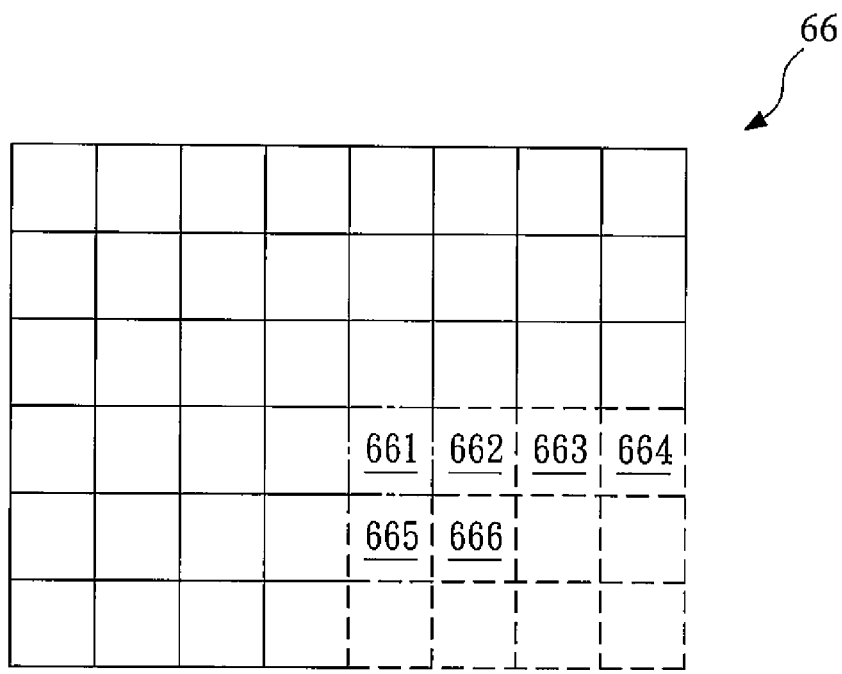
FIG. 11 is a schematic view of the disclosed electronic control module array according to a second exemplary embodiment.

FIG. 11 is a schematic view of the disclosed electronic control module array according to a second exemplary embodiment. The electronic control module array 66 of this exemplary embodiment may be a 4×3 array (as shown by the dotted lines) and is disposed in an 8×6 array. In the electronic control module array 66 of the exemplary embodiment, the electronic control module array 66 includes a main-control-terminal electronic control module 661 and a plurality of electronic control modules 662, 663, 664, 665 and 666. The main-control-terminal electronic control module 661 is located at the upper left corner of the electronic control module array 66.

Figure 12:
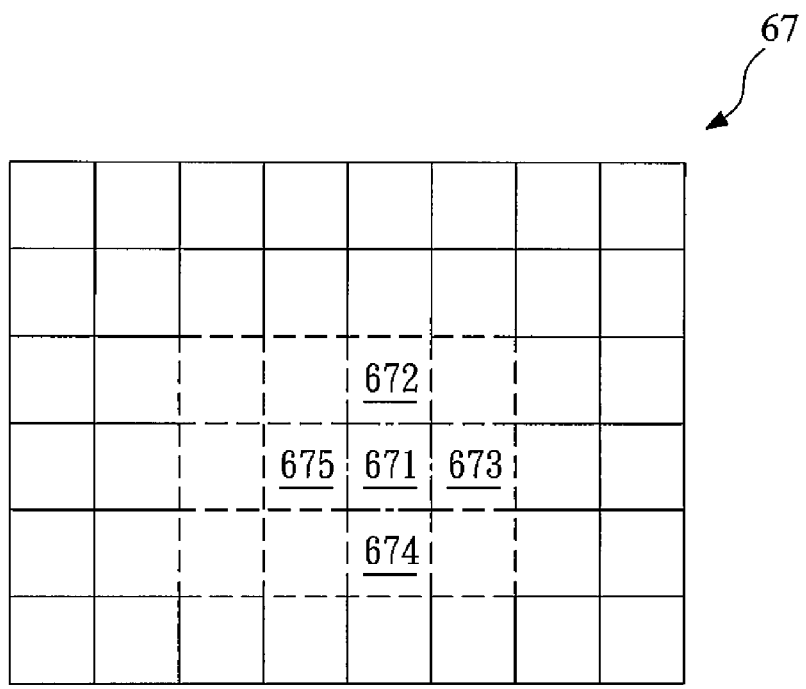
FIG. 12 is a schematic view of the disclosed electronic control module array according to a third exemplary embodiment.

FIG. 12 is a schematic view of the disclosed electronic control module array according to a third exemplary embodiment. The electronic control module array 67 of the exemplary embodiment is a 4×3 array (as shown by the dotted lines) and is disposed in an 8×6 array. In the electronic control module array 67 of the third exemplary embodiment, the electronic control module array 67 includes a main-control-terminal electronic control module 671 and a plurality of electronic control modules 672, 673, 674 and 675. The main-control-terminal electronic control module 671 is located at a position (3, 2) of the electronic control module array 67.

Figure 13:
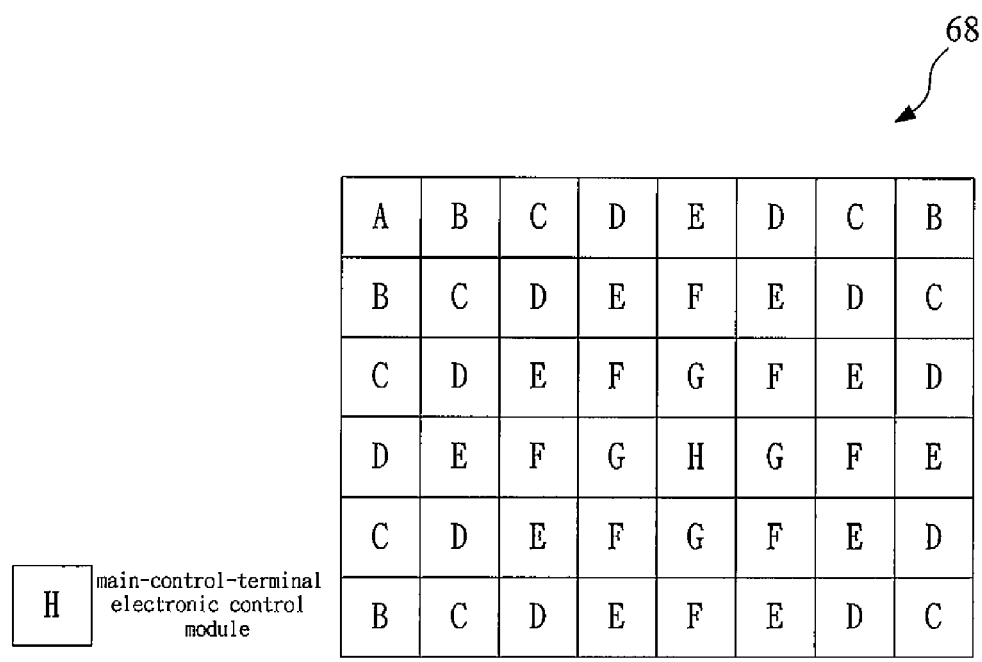
FIG. 13 is a schematic view of the disclosed electronic control module array according to a fourth exemplary embodiment.

FIG. 13 is a schematic view of the disclosed electronic control module array according to a fourth exemplary embodiment. The electronic control module array 68 of this exemplary embodiment may be an 8×6 array. In the electronic control module array 68 of this exemplary embodiment, a main-control-terminal electronic control module H is located at a position (5, 4) of the electronic control module array 68. The second exemplary embodiment to the fourth exemplary embodiment of the disclosed electronic control module array do not limit the corresponding position of the main-control-terminal electronic control module in the electronic control module array, which is different from the first exemplary embodiment of the disclosed electronic control module array that limits the corresponding position of the main-control-terminal electronic control module in the electronic control module array.

Figure 14A:
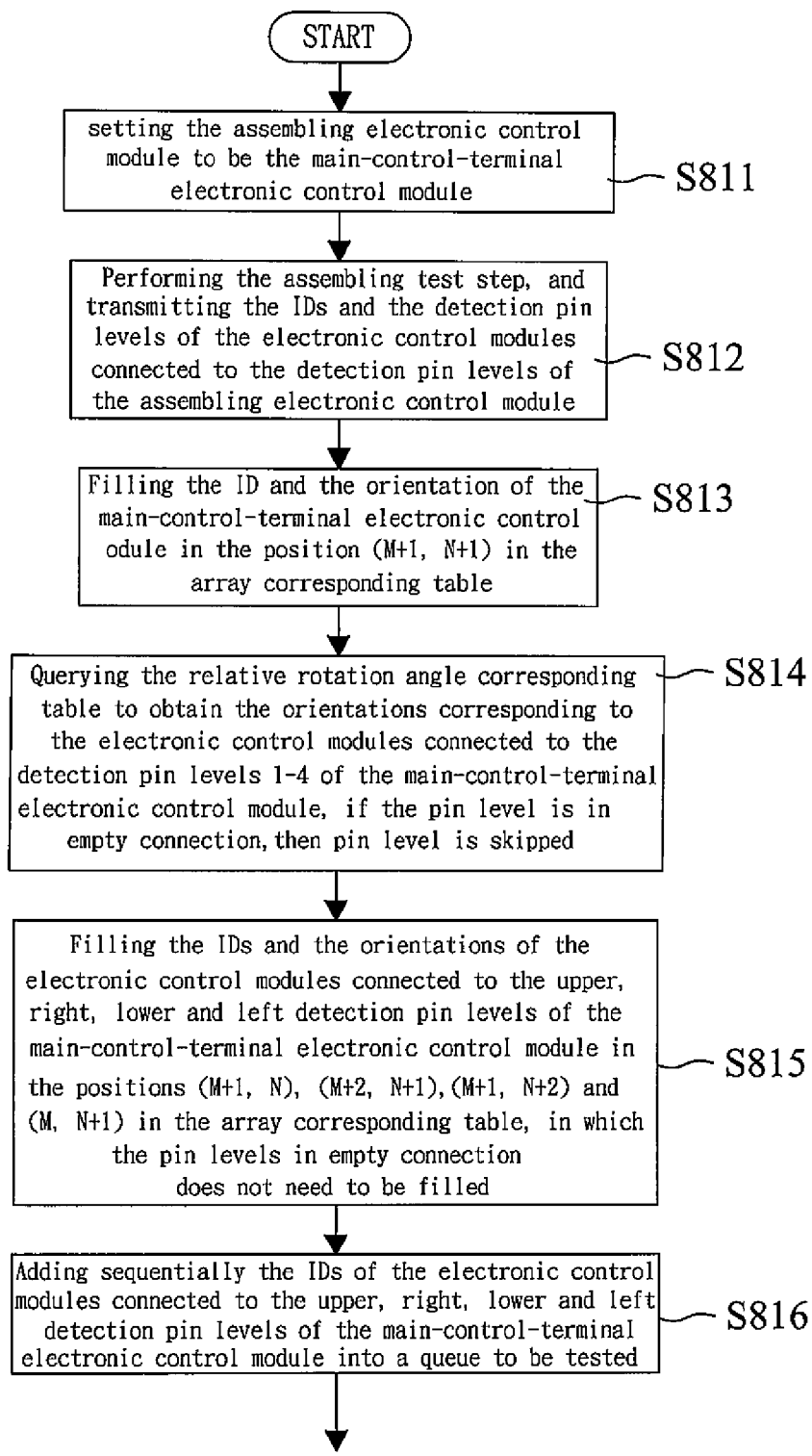
FIG. 14A and FIG. 14B are schematic views of an exemplary embodiment of a decision process of the disclosed electronic control module array according to the second exemplary embodiment.
Figure 14B:
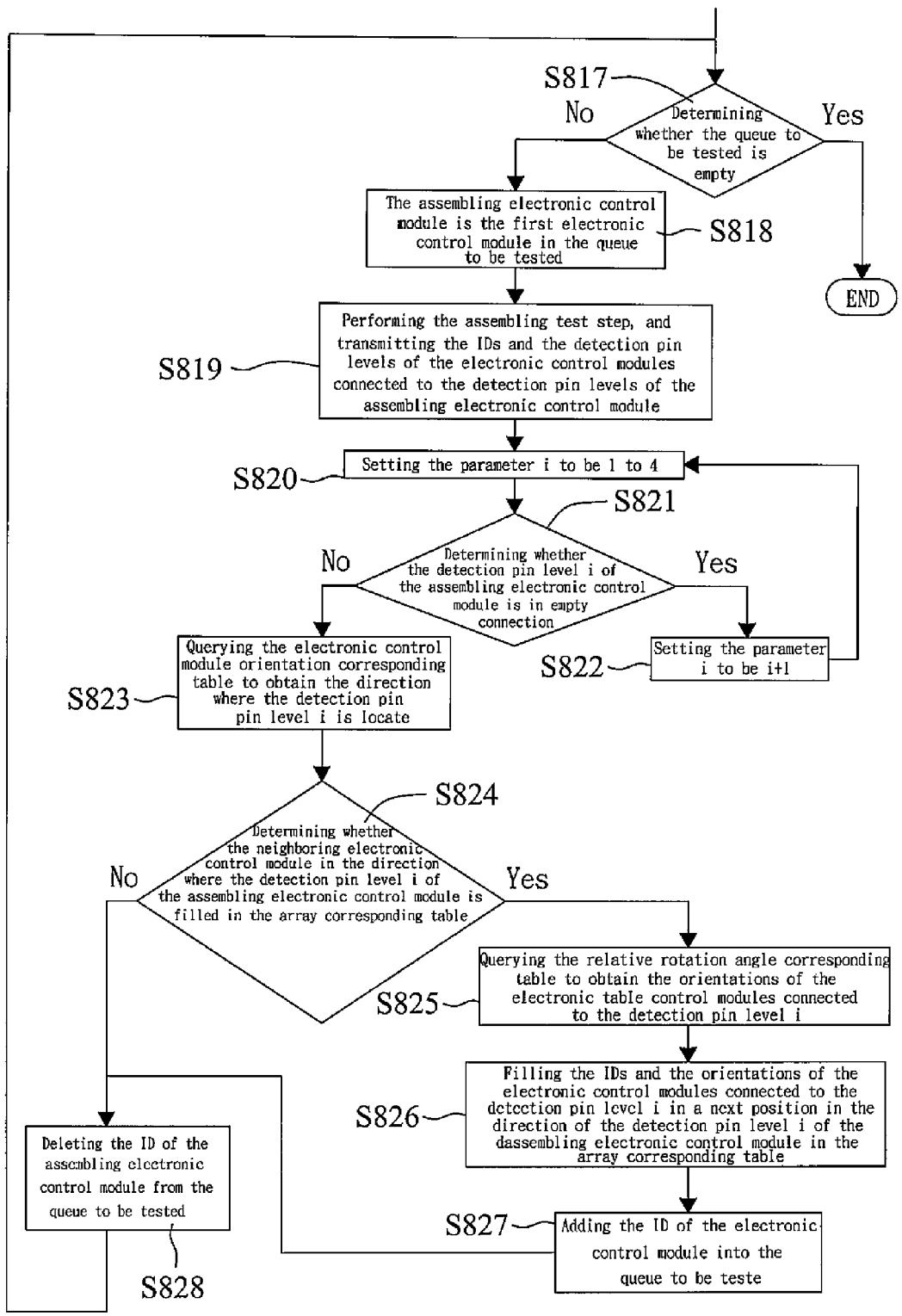

FIG. 14A and FIG. 14B are schematic views of an exemplary embodiment of a decision process of the disclosed electronic control module array according to the second exemplary embodiment. The decision process of the second exemplary embodiment of the electronic control module array is applicable to the second exemplary embodiment to the fourth exemplary embodiment of the disclosed electronic control module array. The exemplary embodiment of the decision process of the second exemplary embodiment of the disclosed electronic control module array is illustrated with an M×N electronic control module array as an example, in which an array corresponding table is 2M×2N, an (M+1, N+1) position of the array corresponding table is the main-control-terminal electronic control module, in which M=4, and N=3.

Referring to 12, FIG. 14A and FIG. 14B, first referring to Step S811, the assembling electronic control module is the main-control-terminal electronic control module 671, the assembling test steps described above is performed, the IDs and the detection pin levels of the electronic control modules connected to the detection pin levels of the assembling electronic control module are transmitted, as shown in Step S812.

Referring to Step S813, the ID and the orientation of the main-control-terminal electronic control module 671 are filled in the position (M+1, N+1) in the array corresponding table, in which the orientation of the main-control-terminal electronic control module is 0 degree. Referring to Step S814, the relative rotation angle corresponding table is queried to obtain the orientations corresponding to the electronic control modules connected to the detection pin levels 1-4 of the main-control-terminal electronic control module, if the pin level is in empty connection, the pin level is skipped. Referring to Step S815, the IDs and the orientations of the electronic control modules 672, 673, 674 and 675 connected to the upper, right, lower and left detection pin levels of the main-control-terminal electronic control module 671 are filled in the positions (M+1, N), (M+2, N+1), (M+1, N+2) and (M, N+1) in the array corresponding table, in which the pin levels in empty connection does not need to be filled. The electronic control module 672 corresponds to the position (M+1, N), the electronic control module 673 corresponds to the position (M+2, N+1), the electronic control module 674 corresponds to the position (M+1, N+2), and the electronic control module 675 corresponds to the position (M, N+1).

Referring to Step S816, the IDs of the electronic control modules 672, 673, 674 and 675 connected to the upper, right, lower and left detection pin levels of the main-control-terminal electronic control module are added sequentially into a queue to be tested. Referring to Step S817, it is determined whether the queue to be tested is empty. If the queue to be tested is not empty, referring to Step S818, the assembling electronic control module is the first electronic control module 672 in the queue to be tested. The assembling test steps described above is performed, and the IDs and detection pin levels of the electronic control modules connected to the detection pin levels of the assembling electronic control module are transmitted, as shown in Step S819.

Referring to Step S820, the parameter it is set to be 1 to 4 to determine four detection pin levels of the assembling electronic control module 672. Referring to Step S821, it is determined whether the detection pin level i of the assembling electronic control module 672 is in empty connection. If the detection pin level i is in empty connection, referring to Step S822, the parameter i is set to be i+1. If the detection pin level i is not in empty connection, referring to Step S823, the electronic control module orientation corresponding table is queried to obtain the direction where the detection pin level i is located.

Referring to Step S824, it is determine whether the neighboring electronic control module in the direction where the detection pin level i of the assembling electronic control module is filled in the array corresponding table. If the neighboring electronic control module is not filled in the array corresponding table, referring to Step S825, the relative rotation angle corresponding table is queried to obtain the orientations of the electronic control modules connected to the detection pin level i. Referring to Step S826, the IDs and the orientations of the electronic control modules connected to the detection pin level i are filled in a next position in the direction of the detection pin level i of the assembling electronic control module in the array corresponding table. Referring to Step S827, the ID of the electronic control module is added into the queue to be tested. Referring to Step S828, the ID of the assembling electronic control module is deleted from the queue to be tested, then Step S817 is performed, and the step of a next electronic control module in the queue to be tested is performed, till the queue to be tested is cleaned up.

Therefore, the decision process of the second exemplary embodiment of the disclosed electronic control module array includes searching for the corresponding detection pin levels of the position indexes m and n where the assembling electronic control module is located and the upper, right, lower and left orientations of the assembling electronic control module in the array corresponding table, so as to complete the array corresponding table.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A control system for identifying corresponding position, comprising:
    a plurality of electronic control modules, each electronic control module includes a microcontroller electrically coupled to at least one joint, and the joint is configured for connecting to a joint of neighboring electronic control module; wherein the electronic control modules include a main-control-terminal electronic control module, an assembling electronic control module and at least one detecting electronic control module; the main-control-terminal electronic control module is configured for assigning one of the electronic control modules to be the assembling electronic control module, and assigning the rest of the electronic control modules to be the detecting electronic control module; the assembling electronic control module is configured for obtaining an identifying signal of a neighboring detecting electronic control module to recognize corresponding position of the electronic control modules.

2. The control system according to claim 1, further comprising a connection port for connecting to an external circuit.

3. The control system according to claim 1, wherein the joint comprises a detection pin and at least one signal bus pin, the microcontroller has a signal bus and at least one detection pin level, the signal bus is electrically connected to the signal bus pin, and the detection pin level is electrically connected to the detection pin.

4. The control system according to claim 3, wherein each electronic control module further comprises a bus interface circuit, in which the signal bus of the microcontroller is electrically connected to the signal bus pin through the bus interface circuit.

5. The control system according to claim 1, wherein each electronic control module further comprises a power supply interface circuit, the microcontroller includes a power supply pin level, the joint includes a power supply pin, and the power supply pin level of the microcontroller is electrically connected to the power supply pin through the power supply interface circuit.

6. The control system according to claim 1, wherein each electronic control module further comprises a plurality of sensors.

7. The control system according to claim 1, further comprising a main-control-terminal orientation corresponding table, an electronic control module orientation corresponding table and a relative rotation angle corresponding table of the assembling electronic control module and the detecting electronic control module.

8. The control system according to claim 1, wherein the microcontroller further comprises a storage unit.

9. The control system according to claim 1, wherein the main-control-terminal electronic control module further comprises a peripheral I/O interface circuit for connecting to an external sensing periphery/driving periphery.

10. The control system according to claim 1, further comprising an array corresponding table, wherein the electronic control modules are arranged as an electronic control module array, the main-control-terminal electronic control module is located at a position of a first row and a first column in the electronic control module array.

11. The control system according to claim 1, further comprising an array corresponding table, wherein the electronic control modules are arranged as an electronic control module array, the main-control-terminal electronic control module is located at any position in the electronic control module array.

12. The control system according to claim 11, wherein the electronic control module array is an M×N array, and the array corresponding table is an 2M×2N array.

13. A control method for identifying corresponding position, comprising:
    providing a plurality of electronic control modules, wherein each electronic control module includes a microcontroller electrically coupled to at least one joint, and the joint is configured for connecting to a joint of neighboring electronic control module;
    assigning one of the electronic control modules to be an assembling electronic control module and assigning the rest of the electronic control modules to be a detecting electronic control module by a main-control-terminal electronic control module; and
    obtaining an identifying signal of a neighboring detecting electronic control module by the assembling electronic control module to recognize corresponding position of the electronic control modules.

14. The control method according to claim 13, wherein the main-control-terminal electronic control module assigns one of the electronic control modules to be the assembling electronic control module and assigns the rest of the electronic control modules to be the detecting electronic control module in turn.

15. The control method according to claim 13, wherein the assembling electronic control module performing an assembling test, the assembling test comprising:
    confirming the number of detecting electronic control modules connected to the assembling electronic control module with the main-control-terminal electronic control module, and setting a logic state of all detection pin levels of the assembling electronic control module assigned by the main-control-terminal electronic control module to be a first logic state;
    setting a detection pin level i of the assembling electronic control module to be a $1^{st}$ detection pin;
    setting a logic state of the detection pin level i of the assembling electronic control module to be a second logic state;

receiving the identifying signal and a detection pin level information of the detecting electronic control module connected to the detection pin level i;

determining whether the detection pin level of the detecting electronic control module detects a signal having the second logic state, wherein if the detection pin level of the detecting electronic control module detects the signal having the second logic state, setting a joint corresponding to the detection pin level i of the assembling electronic control module to be the received detecting electronic control module and a connection pin level; if the detection pin level i of the detecting electronic control module does not detect the signal having the second logic state and does not receiving the identifying signal and a detection pin level information of the detecting electronic control module, setting a joint corresponding to the detection pin level i of the assembling electronic control module to be in a empty connection state; and verifying whether the detection pin level i is an predefined $n^{th}$ detection pin level, wherein if the detection pin level i of the assembling electronic control module is equal to the $n^{th}$ detection pin level, corresponding position of the electronic control modules is reported to the main-control-terminal electronic control module; if the detection pin level i of the assembling electronic control module is not equal to the $n^{th}$ detection pin level, the detection pin level i of the assembling electronic control module is set to be i+1, and the steps after setting the logic state of the detection pin level i of the assembling electronic control module to be the second logic state are repeated.

16. The control method according to claim 15, wherein the detecting electronic control module performing a detection test, the detection test comprising:

setting all the detection pin levels of the detecting electronic control module to be in a detection state;

setting a detection pin level i of the detecting electronic control module to be a $1^{st}$ pin; and determining whether the detection pin level i of the detecting electronic control module detects a signal having a second logic state, wherein if the detection pin level i of the detecting electronic control module detects the signal having the second logic state, the detection pin level i sets a detection pin level information, and the detecting electronic control module broadcasts the identifying signal and the detection pin level information; if the detection pin level i of the detecting electronic control module does not detect the signal having the second logic state and if the detection pin level i is not equal to the $n^{th}$ detection pin level the detecting electronic control module broadcasts the identifying signal and the detection pin level information, otherwise the detection pin level i of the detecting electronic control module is set to be i+1, and the steps after determining whether the detection pin level i of the detecting electronic control module detects the signal having the second logic state are repeated.

17. The control method according to claim 15, wherein the electronic control modules are arranged as an electronic control module array, further comprising:

setting the main-control-terminal electronic control module to be the assembling electronic control module;

performing the assembling test, and transmitting the IDs and the detection pin levels of the electronic control modules connected to the detection pin levels of the assembling electronic control module;

querying a main-control-terminal orientation corresponding table, and transmitting an orientation of the main-control-terminal electronic control module;

filling a ID and the orientation of the main-control-terminal electronic control module in a first position in a first row of an array corresponding table;

querying an electronic control module orientation corresponding table to obtain the detection pin levels at the right side and lower side of the assembling electronic control module, which are i and j respectively;

determining whether the detection pin level i of the assembling electronic control module is in empty connection, wherein if the detection pin level i is not in empty connection, a relative rotation angle corresponding table is queried to obtain the orientation of the electric control module connected to the detection pin level i, and the ID and the orientation of the electronic control module connected to the detection pin level i are filled in a second position of the first row of the array corresponding table;

determining whether a detection pin level j of the assembling electronic control module is in empty connection, wherein if the detection pin level j is not in empty connection, the relative rotation angle corresponding table is queried to obtain the orientations of the electronic control module connected to the detection pin level j, and the ID and the orientation of the electronic control module connected to the detection pin level j are filled into a first position in a second row of the array corresponding table;

determining whether a position at the right side of the assembling electronic control module in the array corresponding table is empty, wherein if the position is not empty, the assembling electronic control module is the electronic control module at the position at the right side of the original assembling electronic control module in the array corresponding table, the assembling test steps are performed, and the IDs and the detection pin levels of the electronic control modules connected to the detection pin levels of the assembling electronic control module are transmitted;

querying the electronic control module orientation corresponding table to obtain the detection pin levels at the right side and lower side of the assembling electronic control module, which are i and j respectively;

determining whether the detection pin level i of the assembling electronic control module is in empty connection, wherein if the detection pin level i is not in empty connection, the relative rotation angle corresponding table is queried to obtain the orientation of the electric control module connected to the detection pin level i, and the ID and the orientation of the electronic control module connected to the detection pin level i are filled in a next position of the same row of the array corresponding table;

determining whether a detection pin level j of the assembling electronic control module is in empty connection, wherein if the detection pin level j is not in empty connection, the relative rotation angle corresponding table is queried to obtain the orientations of the electronic control module connected to the detection pin level j, and the ID and the orientation of the electronic control module connected to the detection pin level j are filled into the same position in a next row of the array corresponding table;

repeating the steps of determining whether the position at the right side of the assembling electronic control module in the array corresponding table is empty and the following steps; and determining whether a first position at a next row of the assembling electronic control module in the array corresponding table is empty if the position at the right side of the assembling electronic control module in the array corresponding table is empty, wherein if the first position is not empty, the assembling electronic control module is the electronic control module at the first position in the next row of the original assembling electronic control module in the array corresponding table, and the assembling test steps and the following steps are performed, till the first position in the next row of the assembling electronic control module in the array corresponding table is empty.

18. The control method according to claim 17, wherein the main-control-terminal electronic control module is located at a position of a first row and a first column in the electronic control module array.

19. The control method according to claim 15, wherein the electronic control modules are arranged as an electronic control module array, the electronic control module array is an M×N array, further comprising:

setting the assembling electronic control module to be the main-control-terminal electronic control module;

performing the assembling test steps, and transmitting the IDs and the detection pin levels of the electronic control modules connected to the detection pin levels of the assembling electronic control module;

filling a ID and a orientation of the main-control-terminal electronic control module in a position (M+1, N+1) in an array corresponding table;

querying a relative rotation angle corresponding table to obtain the orientations corresponding to the electronic control modules connected to the detection pin levels 1-4 of the main-control-terminal electronic control module, wherein if the pin level is in empty connection, the pin level is skipped;

filling the IDs and the orientations of the electronic control modules connected to upper, right, lower and left detection pin levels of the main-control-terminal electronic control module in positions (M+1, N), (M+2, N+1), (M+1, N+2) and (M, N+1) in the array corresponding table wherein the array corresponding table is an 2M×2N array;

adding sequentially the IDs of the electronic control modules connected to upper, right, lower and left detection pin levels of the main-control-terminal electronic control module into a queue to be tested;

determining whether the queue to be tested is empty, wherein if the queue to be tested is not empty, the assembling electronic control module is a first electronic control module in the queue to be tested;

performing the assembling test steps, and transmitting the IDs and the detection pin levels of the electronic control modules connected to the detection pin levels of the assembling electronic control module;

setting the parameter i to be 1 to 4;

determining whether the detection pin level i of the assembling electronic control module is in empty connection, wherein if the detection pin level i is in empty connection, the parameter i is set to be i+1; if the detection pin level i is not in empty connection, an electronic control module orientation corresponding table is queried to obtain a direction where the detection pin level i is located;

determining whether the neighboring electronic control module in a direction where the detection pin level i of the assembling electronic control module is filled in the array corresponding table, wherein if the neighboring electronic control module is not filled in the array corresponding table, the relative rotation angle corresponding table is queried to obtain the orientations of the electronic control modules connected to the detection pin level i, and the IDs and the orientations of the electronic control modules connected to the detection pin level i are filled in a next position in a direction of the detection pin level i of the assembling electronic control module in the array corresponding table, and the ID of the electronic control module is added into the queue to be tested;

deleting the ID of the assembling electronic control module from the queue to be tested; and repeating the steps of determining whether the queue to be tested is empty and the following steps till the queue to be tested is cleaned up.

20. The control method according to claim 19, wherein the main-control-terminal electronic control module is located at any position in the electronic control module array.

* * * * *